United States Patent
Takai et al.

(10) Patent No.: US 6,686,045 B2
(45) Date of Patent: Feb. 3, 2004

(54) COMPOSITE FINE PARTICLES, CONDUCTIVE PASTE, AND CONDUCTIVE FILM

(75) Inventors: Yasushi Takai, Takefu (JP); Iwao Kubota, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 5 days.

(21) Appl. No.: 10/058,148

(22) Filed: Jan. 29, 2002

(65) Prior Publication Data

US 2002/0146564 A1 Oct. 10, 2002

(30) Foreign Application Priority Data

Jan. 31, 2001 (JP) ........................................ 2001-023749

(51) Int. Cl.⁷ ................................................. B32B 5/16
(52) U.S. Cl. ...................... 428/403; 428/404; 428/210; 361/321.4; 361/306.3; 252/512; 252/513
(58) Field of Search ................................ 428/403, 404, 428/210; 361/321.4, 306.3; 252/512, 513

(56) References Cited

U.S. PATENT DOCUMENTS

| | | | | |
|---|---|---|---|---|
| 5,578,266 A | * | 11/1996 | Takai et al. .................. | 420/83 |
| 6,162,277 A | * | 12/2000 | Toshima et al. ............... | 75/255 |
| 6,326,076 B1 | * | 12/2001 | Takai ........................ | 428/312.6 |
| 6,517,745 B2 | * | 2/2003 | Hayashi et al. ............. | 252/513 |
| 6,576,354 B2 | * | 6/2003 | Tsukatani et al. ........... | 428/702 |

FOREIGN PATENT DOCUMENTS

| | | | |
|---|---|---|---|
| JP | 1997-0342793 | | 12/1997 |
| JP | 2992270 | | 10/1999 |
| JP | 11343501 | * | 12/1999 |
| JP | 2000-63901 | | 2/2000 |
| JP | 2000063901 A | * | 2/2000 |
| JP | 2000-282102 | | 10/2000 |
| JP | 2000282102 A | * | 10/2000 |

* cited by examiner

Primary Examiner—Leszek Kiliman
(74) Attorney, Agent, or Firm—Birch, Stewart, Kolasch & Birch, LLP

(57) ABSTRACT

Composite fine particles each having a nickel base core whose surface is coated with an oxide are effective for improving shrinkage upon firing and metal oxidation during binder burnout. The nickel base core has the formula: $Ni_{(1-a-b)}Z_a Z'_b$ wherein Z is Ag, Au, Co, Cu, Pd or a mixture of any, Z' is Li, K, Na, B, P or a mixture of any, $0 \leq a \leq 0.4$, $0 \leq b \leq 0.1$ (weight proportion), and $a+b>0$, and the coating oxide is an oxide of Ag, Ba, Co, Cu, Ni, Sn, Ti, Zr, rare earth elements including Y, Pd or a mixture of any.

8 Claims, No Drawings

COMPOSITE FINE PARTICLES, CONDUCTIVE PASTE, AND CONDUCTIVE FILM

This invention relates to composite fine particles comprising a nickel base core and an oxide coating, an electrically conductive paste using the particles, and an electrically conductive film obtained therefrom.

BACKGROUND OF THE INVENTION

In the current trend toward the size reduction of portable equipment and digital electric appliances, it is under study to reduce the size and increase the capacitance of multilayer ceramic capacitors. For the size reduction and capacitance increase of multilayer ceramic capacitors, it is most effective to reduce the thickness of dielectric layers and internal electrode layers in the multilayer structure. To reduce the thickness of internal electrode layers, the conductive paste from which they are made must contain finer metal particles. Among the currently available internal electrode layers, the thinnest layers have a thickness of the order of 1 micron and are made of a conductive paste containing metal particles of a single metal element such as nickel, silver or palladium with a mean particle size of about 1 micron. There is a good possibility of reducing the thickness of internal electrode layers to about 0.3 micron. To form such thin layers, presumably the metal particles in the conductive paste must have a mean particle size of less than about 0.2 micron.

However, mainly three problems arise in reducing the size of metal particles. A first problem is that finer metal particles suffer greater thermal shrinkage. During the firing of multilayer ceramic capacitors, cracks and other defects occur due to the differential thermal shrinkage between dielectric layers and internal electrode layers. A second problem arises from the greater surface area of finer metal particles, which permits metal oxidation during binder burnout from ceramic material. A third problem is due to the ferromagnetism of nickel. As nickel particles are finely divided, they become single domain particles having strong coercivity. Due to magnetic interaction, such particles tend to agglomerate together. A number of solutions have been proposed to overcome these three problems.

The method of preparing fine metal particles is generally divided into three types.
(1) Metal particles are prepared from an aqueous solution of a soluble or insoluble metal compound by reducing with a reducing agent such as hydrazine. Because of the solution reaction, this process is often designated wet process.
(2) Metal particles are prepared from an aqueous solution of a soluble or insoluble metal compound by spraying and heating at elevated temperatures in hydrogen gas for direct reduction. Because hydrogen gas is used, this process is often designated gas phase process.
(3) Metal particles are prepared by pyrolysis of carbonyl and similar compounds at elevated temperatures.

The wet process can produce metal particles with a sharp particle size distribution. However, these metal particles have a great shrinkage factor because they have not been heat treated. To eliminate such inconvenience, JP-A 11-172306 proposes to add magnesium and/or calcium to metal particles, and Japanese Patent No. 2992270 and JP-A 2000-282102 disclose to coat part of the particle surface with an oxide. Likewise, the metal particles produced by the gas phase process have a similar shrinkage factor although the shrinkage start is retarded because they are produced at a higher temperature than in the wet process. Similar countermeasures are taken as disclosed in JP-A 2000-63901. Although the shrinkage of metal particles can be improved by the above modifications, all these processes are unsatisfactory in that the diameter of metal particles is as large as about 1.0 μm. Especially, particles of a single metal element such as nickel inevitably generate a magnetic field due to their own magnetism.

SUMMARY OF THE INVENTION

An object of the invention is to provide composite fine particles capable of overcoming the problems of shrinkage during firing and metal oxidation. Another object of the invention is to provide an electrically conductive paste using the particles, and an electrically conductive film obtained therefrom.

It has been found that a useful electrode material is constructed by composite fine particles each comprising a core of the general formula (1):

$$Ni_{(1-a-b)}Z_a Z'_b \qquad (1)$$

wherein Z is Ag, Au, Co, Cu, Pd or a mixture of any, Z' is Li, K, Na, B, P or a mixture of any, "a" and "b" representative of a weight proportion of Z and Z' are $0 \leq a \leq 0.4$ and $0 \leq b \leq 0.1$, respectively, and a+b>0, which is at least partially surface coated with an oxide of Ag, Ba, Co, Cu, Ni, Sn, Ti, Zr, rare earth elements including Y, Pd or a mixture of any. When these composite fine particles are used as an internal electrode material for multilayer ceramic capacitors or an electronic ceramic material, the shrinkage during the firing of multilayer ceramic capacitors is minimized and the metal oxidation during binder burnout from electronic ceramic materials is suppressed. The invention is predicated on this finding.

Therefore, the invention provides the composite fine particles defined above; an electrically conductive paste comprising the composite fine particles and an organic vehicle; and an electrically conductive film obtained by firing the conductive paste and having a surface resistivity of up to 100 mΩ.

DESCRIPTION OF THE PREFERRED EMBODIMENT

The composite fine particles of the invention is defined as comprising a core of a nickel base metal material whose surface is at least in part coated with an oxide. The metal material has the general formula (1):

$$Ni_{(1-a-b)}Z_a Z'_b \qquad (1)$$

wherein Z is at least one element selected from the group consisting of Ag, Au, Co, Cu, and Pd, Z' is at least one element selected from the group consisting of Li, K, Na, B, and P, "a" representative of a weight proportion of Z is 0 to 0.4, "b" representative of a weight proportion of Z' is 0 to 0.1, and "a" and "b" are not zero at the same time (i.e., "a"+"b">0). The oxide is an oxide of at least one element selected from the group consisting of Ag, Ba, Co, Cu, Ni, Sn, Ti, Zr, rare earth elements including Y, and Pd, preferably Ag, Ba, Co, Cu, Ni, Sn, and Pd.

Metal particles serving as the core are nickel based and preferably produced by the wet process. When fine metal particles are produced by reductive reaction in solution, it is crucial how to generate many nuclei. The reaction must be instantaneous. Then, if there is present an element which is reduced, prior to nickel, to form nuclei, finer particles can be produced. For this reason, one or more of Ag, Au, Co, Cu, and Pd are used as the nucleating element Z. Of these, Ag and Cu are electrically conductive and preferred. Cu is also preferred because of low cost.

For restraining shrinkage, the content of element Z is 0 (preferably more than 0%) to 40% by weight of the metal material, that is, "a" (weight proportion) in formula (1) is $0 \leq a \leq 0.4$. With a Z content in excess of 40% by weight, the melting point of metal material lowers below the practically acceptable level when Z is Cu or Pd, and the metal material becomes expensive when Z is Ag, Au or Co. The lower limit of the Z content is preferably 1% by weight or more. The preferred Z content is in the range of 3 to 10% by weight when it is desired to produce particles with a mean particle size of up to 0.2 μm.

For further improvement in shrinkage, it is effective to add to the metal particles another element Z' selected from Li, K, Na, B, P and a mixture of any. Of these, B and P form such compounds as $Ni_3B$ and $Ni_3P$ which are harder than nickel and serve to suppress the shrinkage of nickel. Li, K and Na form with nickel a solid solution which contributes to a further suppression of shrinkage.

The content of element Z' is 0 (preferably more than 0%) to 10% by weight of the metal material, that is, "b" (weight proportion) in formula (1) is $0 < b \leq 0.1$. With a Z' content in excess of 10% by weight, a eutectic point appears and the melting point of metal material lowers below the practically acceptable level when Z' is B or P, and the amount of Z diffusing into the dielectric layer becomes problematic when Z' is Li, K or Na. It is generally believed that the concentration of Li, K or Na affects the dielectric properties of dielectric layer when the concentration exceeds 500 ppm. Then the invention favors to add Li, K or Na in an amount of 0.001 to 1% by weight of the metal material. It should be noted that "a" and "b" are not zero at the same time (i.e., a+b>0).

Alloying of nickel with Z and Z' also serves to restrain the agglomeration of particles due to their high coercivity. This is confirmed by measuring the coercivity using a vibrating sample magnetometer (VSM).

The size of crystallites in the metal particles or core as analyzed by X-ray diffraction is the size of grains constituting the polycrystalline structure. Preferably the shrinkage start temperature becomes high when crystallites have a size of 200 to 700 angstroms.

According to the invention, the surface of the nickel-base alloy particle or core is at least in part coated with an oxide of one or more elements selected from among Ag, Ba, Co, Cu, Ni, Sn, Ti, Zr, rare earth elements including Y, and Pd. The coating weight is preferably up to 10% by weight, more preferably 1 to 10% by weight, and most preferably 0.5 to 5% by weight of the entire composite fine particle.

Most often, the surface of alloy particles is coated with an oxide precursor such as a hydroxide, carbonate or basic carbonate, which is then heat treated in an inert atmosphere or vacuum to thereby cover the alloy particle surface with the oxide. The heat treatment allows crystal grains to grow within the alloy particles, holding down shrinkage. The surface oxide is presumably effective for suppressing oxidation during the binder burnout of various electronic ceramic materials in air. The coating oxide is required to have least influence on the dielectric properties of an adjacent dielectric layer even after diffusion into the dielectric layer and not to aggravate the electric conductivity thereof. A choice is thus made among the oxides of Ag, Ba, Co, Cu, Ni, Sn, Ti, Zr, rare earth elements including Y, and Pd. The precursor is a compound which does not aggravate electric conductivity because it is reduced into a metal at a temperature of higher than about 800° C. when various electronic ceramic materials are fired in a reducing atmosphere at a temperature of 1,200° C. to 1,350° C.

In one preferred embodiment, the composite fine particles are prepared by the method described below. As sources to form the alloy to become the core, predetermined amounts of a water-soluble nickel compound (e.g., nickel sulfate, nitrate or chloride) and a compound of an element to be added (e.g., Li, K, Na, B or P) are weighed. The compounds were admitted into pure water and dissolved therein. An alkaline solution is added to the solution so as to adjust to pH 13 or above. The alkali used to this end is preferably potassium hydroxide or sodium hydroxide. The molar ratio of OH/Ni may be in the range of 3/1 to 15/1. Then an aqueous solution of a nucleating or catalyzing metal such as Ag, Au, Co, Cu or Pd (e.g., in the form of sulfate, nitrate or chloride solution) is quickly admitted to the nickel solution and after temperature adjustment to 50 to 200° C., a reducing agent quickly admitted thereto. The preferred reducing agent is hydrazine or sodium borohydride. The molar ratio of reducing agent/metal may be in the range of 3/1 to 10/1. The reaction time is preferably about 10 to 30 minutes. Added next is a water-soluble compound (e.g., sulfate, nitrate or chloride) of Ag, Ba, Co, Cu, Ni, Sn, Ti, Zr, rare earth elements including Y, or Pd which is a starting material for the coating oxide. A precipitating agent such as alkali or urea is added whereupon the resulting metal (alloy) particles co-precipitate together with the oxide precursor (e.g., hydroxide, carbonate or basic carbonate). If possible, the resulting metal particles are dispersed in a ball mill or the like prior to the co-precipitation. The co-precipitates of metal particles with the oxide precursor are filtered and washed with pure water. After surface coating with a saturated fatty acid having 12 to 26 carbon atoms to a thickness of 5 to 50 nm, the co-precipitates are heat treated in vacuum or an inert atmosphere at a temperature of 200 to 1000° C., preferably 400 to 1000° C. for 2 to 6 hours, yielding oxide-coated metal fine particles. If some particles have agglomerated as a result of heat treatment, such agglomerates are disintegrated by means of a grinding mill.

For use as an electrode material, the composite fine particles should have a low electric resistance. In this regard, the composite particles should preferably have a volume resistivity of up to 100 mΩcm as determined by packing a cell of predetermined volume with the particles and measuring the resistance of the cell by a four-terminal method. Composite particles with a volume resistivity of more than 100 mΩcm may fail to provide a surface resistivity necessary as the electrode even when sintered in a reducing atmosphere. To reduce the electric resistance of composite particles, the coating oxide should preferably have a thickness of 10 nm or less.

Also preferably, the composite fine particles have a mean particle size of 0.05 to 0.7 μm.

As mentioned in the preamble, for the capacitance increase of multilayer ceramic capacitors, it is most effective to reduce the thickness of internal electrode layers in the multilayer structure. To reduce the thickness of internal electrode layers, the conductive paste from which they are made must contain finer metal particles. It is also important that more metal particles be loaded per unit volume. In this regard, the mean particle size, particle size distribution and shape of particles become important. The mean particle size should preferably be smaller. The particle size distribution should preferably be one approaching the closest packing. The particle size can be measured by laser diffractometry or from an observation under a scanning electron microscope. The particle size referred to herein is a Fisher Subsieve Sizer diameter. The particle shape should preferably be spherical. This factor is also represented by bulk density, tap density or compression density.

The size of crystallites corresponds to the mean particle size of single crystals. The composite fine particles of the invention are polycrystalline particles in which the shrinkage start temperature becomes higher (or retarded) as the mean particle size of single crystals increases. The size of crystallites can be controlled by a choice of heat treating conditions. Without heat treatment, crystallites have a size of 100 to 200 Å. When heat treated at a temperature of 400° C. or higher, crystallites grow to a size of 200 to 300 Å. When heat treated at a temperature of 1,000° C. or higher, crystallites grow to a size of 600 to 700 Å.

The composite fine particles of the invention are suited as an electrode material. In this embodiment, an electrically conductive paste thereof in an organic vehicle is preferably prepared and used. The conductive paste is typically composed of 50 to 85% by weight of the composite particles and the balance of the organic vehicle.

The organic vehicle used herein contains an organic or inorganic binder, a dispersant and plasticizer, and a diluent. More illustratively, the binder is selected from cellulose resins such as ethyl cellulose and hydroxypropyl cellulose, polyvinyl butyral and acrylic resins and used in an amount of about 5 to 20% by weight of the vehicle. The dispersant and plasticizer is typically dibutyl phthalate and used in an amount of up to about 5% by weight, especially about 1 to 3% by weight of the vehicle. The balance is the diluent which is selected from unsaturated alcohols such as terpineol and ethers such as 2-methoxyethanol. The vehicle may have a viscosity of about 5 to 25 PaS.

The conductive paste is applied onto a suitable substrate, for example, of an oxide base ceramic material such as alumina, by a conventional technique such as screen printing. It is then heated in air at 300 to 500° C. for binder burnout and then fired in a reducing atmosphere at 1150 to 1350° C. for 2 to 6 hours to form a conductive film which serves as an electrode. The thickness of the film is adjusted in terms of the opening of the screen and the viscosity of the paste, for example. In this way, there is obtained a conductive film having a surface resistivity of up to 100 mΩ after sintering under ceramic firing conditions, which is ready for use as an electrode.

The composite fine particles of the invention are useful for use in a conductive paste to form a conductive film serving as an electrode because they are effective for minimizing shrinkage upon firing and metal oxidation upon binder burnout.

EXAMPLE

Examples of the invention are given below by way of illustration and not by way of limitation.

Example 1

Nickel sulfate hexahydrate, 431 g, was weighed and dissolved in pure water to form 1.7 liters of a nickel sulfate solution. With stirring at room temperature, 50 g of trisodium phosphate dodecahydrate was added to 0.8 liter of a 48 wt % aqueous solution of sodium hydroxide. Thereafter, the nickel sulfate solution was slowly added thereto over about one hour. The temperature was raised to 95° C., 1 liter of a 60 wt % aqueous hydrazine solution was added thereto over about 30 seconds. After reaction for 20 minutes, the temperature was lowered below 40° C. and 11 g of nickel sulfate hexahydrate was added. The excess of alkali was neutralized with hydrochloric acid to pH 9. The particles thus obtained were filtered and washed with a solution of stearic acid in ethanol for coating the particles on surfaces thereof with stearic acid. The particles were heat treated in an inert atmosphere (Ar) at 600° C. for 4 hours.

There were obtained composite particles whose composition was analyzed by ICP. The results are shown in Table 1. The particle size distribution was determined by the Fisher Subsieve Sizer method. The size of crystallites was determined by taking an X-ray diffraction diagram and calculating according to Scherrer method. The outer appearance of particles was observed by photomicrography using SEM. The volume resistivity was determined by packing a cell of predetermined volume with particles and measuring the resistance of the cell by a four-terminal method. The results are shown in Table 2.

A 2 wt % aqueous solution of methyl cellulose (MC) was added to the composite particles in an amount of 0.5 wt % based on the weight of the particles and mixed therewith, followed by vacuum drying. The dry particles were press molded in mold cavities with a diameter of 30 mm under a pressure of 300 kg/cm$^2$, obtaining a plurality of moldings. The shrinkage factor of the molding during sintering was measured. More particularly, after binder burnout in air at 400° C. for one hour, the moldings were fired at 600° C., 800° C., 1,000° C. or 1,300° C. for 2 hours while flowing a mixture of $N_2$+3 wt % $H_2$. The sintered bodies were taken out and the shrinkage factor was calculated for each of the firing temperatures. The results are shown in Table 3.

Next, 95 wt % of terpineol was mixed with 5 wt % of hydroxypropyl cellulose (HPC). This organic solvent was admixed with the composite particles in a weight ratio of 40/60 to form a paste. The viscosity of the paste was measured by a Brookfield viscometer, finding a viscosity of 13,000 cps (13 PaS). Using a screen printing machine and a 250-mesh screen, the paste was printed on an alumina substrate. After binder burnout in air at 400° C. for one hour, the paste was fired at 1,300° C. for 2 hours while flowing a mixture of $N_2$+3 wt % $H_2$. The thickness and surface resistivity of the resulting film were measured. The results are shown in Table 4.

Example 2

Composite particles were prepared as in Example 1. Specifically, 397 g of nickel sulfate hexahydrate was weighed and dissolved in pure water to form 1.5 liters of a nickel sulfate solution. With stirring at room temperature, 50 g of trisodium phosphate dodecahydrate was added to 1.3 liters of a 48 wt % aqueous solution of sodium hydroxide. Thereafter, the nickel sulfate solution was slowly added thereto over about one hour. Further, 0.15 liter of a 0.5 mol/l silver nitrate solution was added. The temperature was raised to 55° C., and 1 liter of a 60 wt % aqueous hydrazine solution was added thereto over about 30 seconds. After reaction for 20 minutes, the temperature was lowered below 40° C. and 5 g of palladium chloride was added. The particles thus obtained were filtered and washed with a solution of lauric acid in ethanol for coating the particles on surfaces thereof with lauric acid. The particles were heat treated in an inert atmosphere (Ar) at 400° C. for 4 hours. The composite particles thus obtained were examined for composition, particle size distribution, crystallite size, particle outer appearance and volume resistivity by the same tests as in Example 1. Using the composite particles, moldings were prepared by the same method as in Example 1, and the shrinkage factor thereof during sintering was determined. A paste was prepared by the same formulation and method as in Example 1 and printed on an alumina substrate using a screen printing machine and a 250-mesh screen, and surface resistivity was measured. The results are shown in Tables 1 to 4.

Example 3

Composite particles were prepared as in Example 1. Specifically, 402 g of nickel sulfate hexahydrate was weighed and dissolved in pure water to form 1.5 liters of a nickel sulfate solution. With stirring at room temperature, 50 g of trisodium phosphate dodecahydrate was added to 0.3 liter of a 48 wt % aqueous solution of sodium hydroxide. Thereafter, the nickel sulfate solution was slowly added thereto over about one hour. Further, 0.25 liter of a 0.5 mol/l copper sulfate solution was added. The temperature was raised to 50° C., and 0.4 liter of a 60 wt % aqueous hydrazine solution was added thereto over about 60 seconds. After reaction for 20 minutes, the temperature was lowered below 400° C. and 11 g of nickel chloride tetrahydrate was added. The particles thus obtained were filtered and washed with a solution of stearic acid in ethanol for coating the particles on surfaces thereof with stearic acid. The particles were heat treated in an inert atmosphere (Ar) at 600° C. for 4 hours. The composite particles thus obtained were examined for composition, particle size distribution, crystallite size, particle outer appearance and volume resistivity by the same tests as in Example 1. Using the composite particles, moldings were prepared by the same method as in Example 1, and the shrinkage factor thereof during sintering was determined. A paste was prepared by the same formulation and method as in Example 1 and printed on an alumina substrate using a screen printing machine and a 250-mesh screen, and surface resistivity was measured. The results are shown in Tables 1 to 4.

Example 4

Composite particles were prepared as in Example 3. Specifically, 302 g of nickel sulfate hexahydrate was weighed and dissolved in pure water to form 1.5 liters of a nickel sulfate solution. With stirring at room temperature, 50 g of trisodium phosphate dodecahydrate was added to 0.3 liter of a 48 wt % aqueous solution of sodium hydroxide. Thereafter, the nickel sulfate solution was slowly added thereto over about one hour. Further, 0.94 liter of a 0.5 mol/l copper sulfate solution was added. The temperature was raised to 50° C., 0.3 liter of a 60 wt % aqueous hydrazine solution was added thereto over about 5 minutes. After reaction for 20 minutes, the temperature was lowered below 40° C. and 11 g of nickel chloride tetrahydrate was added. The particles thus obtained were filtered and washed with a solution of stearic acid in ethanol for coating the particles on surfaces thereof with stearic acid. The particles were heat treated in an inert atmosphere (Ar) at 500° C. for 4 hours. The composite particles thus obtained were analyzed for composition, particle size distribution, crystallite size, particle outer appearance and volume resistivity by the same tests as in Example 1. Using the composite particles, moldings were prepared by the same method as in Example 1, and the shrinkage factor thereof during sintering was determined. A paste was prepared by the same formulation and method as in Example 1 and printed on an alumina substrate using a screen printing machine and a 250-mesh screen, and surface resistivity was measured. The results are shown in Tables 1 to 4.

Example 5

Composite particles were prepared as in Example 1. Specifically, 376 g of nickel sulfate hexahydrate was weighed and dissolved in pure water to form 1.8 liters of a nickel sulfate solution. A 40 wt % potassium hydroxide solution was used instead of the 48 wt % sodium hydroxide solution. An autoclave was charged with 1 liter of the 40 wt % potassium hydroxide solution. With stirring at room temperature, the nickel sulfate solution was slowly added thereto over about one hour. Further, 0.5 liter of a 0.5 mol/l cobalt sulfate solution was added. At room temperature, 1 liter of a 60 wt % aqueous hydrazine solution was combined with 0.1 liter of a 10 wt % sodium borohydride and added over about 30 seconds. After reaction for 20 minutes at 180° C., the temperature was lowered below 40° C. and 11 g of copper sulfate heptahydrate was added. The particles thus obtained were filtered and washed with a solution of stearic acid in ethanol for coating the particles on surfaces thereof with stearic acid. The particles were heat treated in an inert atmosphere (Ar) at 600° C. for 4 hours. The composite particles thus obtained were analyzed for composition, particle size distribution, crystallite size, particle outer appearance and volume resistivity by the same tests as in Example 1. Using the composite particles, moldings were prepared by the same method as in Example 1, and the shrinkage factor thereof during sintering was determined. A paste was prepared by the same formulation and method as in Example 1 and printed on an alumina substrate using a screen printing machine and a 250-mesh screen, and surface resistivity was measured. The results are shown in Tables 1 to 4.

Example 6

Composite particles were prepared as in Example 5. Specifically, 400 g of nickel sulfate hexahydrate was weighed and dissolved in pure water to form 1.8 liters of a nickel sulfate solution. With stirring at room temperature, the nickel sulfate solution was slowly added to 1 liter of a 40 wt % potassium hydroxide solution over about one hour. Further, 0.2 liter of a 0.5 mol/l palladium chloride solution was added. At room temperature, 1 liter of a 60 wt % aqueous hydrazine solution was combined with 0.1 liter of a 10 wt % sodium borohydride and added over about 10 minutes. After reaction for 20 minutes at 50° C., the temperature was lowered below 40° C. and 5 g of tin chloride dehydrate was added. The particles thus obtained were filtered and washed with a solution of stearic acid in ethanol for coating the particles on surfaces thereof with stearic acid. The particles were heat treated in an inert atmosphere (Ar) at 600° C. for 4 hours. The composite particles thus obtained were examined for composition, particle size distribution, crystallite size, particle outer appearance and volume resistivity by the same tests as in Example 1. Using the composite particles, moldings were prepared by the same method as in Example 1, and the shrinkage factor thereof during sintering was determined. A paste was prepared by the same formulation and method as in Example 1 and printed on an alumina substrate using a screen printing machine and a 250-mesh screen, and surface resistivity was measured. The results are shown in Tables 1 to 4.

Comparative Example 1

Particles were prepared as in Example 1. Specifically, 450 g of nickel sulfate hexahydrate was weighed and dissolved in pure water to form 1.75 liters of a nickel sulfate solution. With stirring at room temperature, the nickel sulfate solution was slowly added to 1.3 liters of a 28 wt % sodium hydroxide solution over about one hour. After the temperature was raised to 70° C., 1 liter of a 60 wt % aqueous hydrazine solution was added over about 30 seconds. After reaction for 60 minutes, the resulting particles were filtered and dried in an inert atmosphere (Ar) at 100° C. for 4 hours. The particles thus obtained were examined for composition, particle size distribution, crystallite size, particle outer appearance and volume resistivity by the same tests as in Example 1. Using the particles, moldings were prepared by the same method as in Example 1, and the shrinkage factor thereof during sintering was determined. A paste was prepared by the same formulation and method as in Example 1 and printed on an alumina substrate using a screen printing machine and a 250-mesh screen, and surface resistivity was measured. The results are shown in Tables 1 to 4.

Comparative Example 2

Particles were prepared as in Example 1. Specifically, 450 g of nickel sulfate hexahydrate was weighed and dissolved in pure water to form 1.75 liters of a nickel sulfate solution. With stirring at room temperature, the nickel sulfate solution was slowly added to 1.3 liters of a 28 wt % sodium hydroxide solution over about one hour. After the temperature was raised to 70° C., 1 liter of a 60 wt % aqueous hydrazine solution was added over about 30 seconds. After reaction for 60 minutes, the temperature was lowered below 40° C. and 10 g of yttrium chloride added. The resulting particles were filtered and dried in an inert atmosphere (Ar) at 100° C. for 4 hours. The particles thus obtained were examined for composition, particle size distribution, crystallite size, particle outer appearance and volume resistivity by the same tests as in Example 1. Using the particles, moldings were prepared by the same method as in Example 1, and the shrinkage factor thereof during sintering was determined. A paste was prepared by the same formulation and method as in Example 1 and printed on an alumina substrate using a screen printing machine and a 250-mesh screen, and surface resistivity was measured. The results are shown in Tables 1 to 4.

TABLE 1

Particle composition (wt %)

| | Ni | Z | | | | Z' | | | | Coating oxide | |
| | | Ag | Co | Cu | Pd | B | K | Na | P | Type | Content |
|---|---|---|---|---|---|---|---|---|---|---|---|
| Example 1 | 99.995 | 0 | 0 | 0 | 0 | 0 | 0 | 0.005 | 0 | Ni | 3 |
| Example 2 | 88.495 | 8 | 0 | 0 | 0 | 0 | 0 | 0.005 | 3.5 | Pd | 3 |
| Example 3 | 88.497 | 0 | 0 | 8 | 0 | 0 | 0 | 0.003 | 3.5 | Ni | 3 |
| Example 4 | 66.497 | 0 | 0 | 30 | 0 | 0 | 0 | 0.003 | 3.5 | Ni | 3 |
| Example 5 | 83.99 | 0 | 15 | 0 | 0 | 1 | 0.01 | 0 | 0 | Cu | 3 |
| Example 6 | 88.99 | 0 | 0 | 0 | 10 | 1 | 0.01 | 0 | 0 | Sn | 3 |
| Comparative Example 1 | 100 | 0 | 0 | 0 | 0 | 0 | 0 | 0 | 0 | — | 0 |
| Comparative Example 2 | 100 | 0 | 0 | 0 | 0 | 0 | 0 | 0 | 0 | Y | 3 |

Note that for the core, the total of Ni+Z+Z' is 100% by weight, and the content (wt %) of coating oxide is based on the composite particles (that is, the core and the coating oxide combined).

TABLE 2

Physical properties of particles

| | Fisher diameter ($\mu$m) | Crystallite size (Å) | Volume resistivity (mΩ cm) |
|---|---|---|---|
| Example 1 | 0.7 | 360 | 5 |
| Example 2 | 0.5 | 260 | 6 |
| Example 3 | 0.5 | 380 | 2 |
| Example 4 | 0.5 | 400 | 1 |
| Example 5 | 0.5 | 310 | 8 |
| Example 6 | 0.5 | 330 | 10 |
| Comparative Example 1 | 1 | 150 | 1 |
| Comparative Example 2 | 1.2 | 150 | 10 |

TABLE 3

Shrinkage factor of conductive paste (%)

| | 400° C. | 600° C. | 800° C. | 1000° C. | 1300° C. |
|---|---|---|---|---|---|
| Example 1 | 0.7 | 0 | −3 | −5 | −6 |
| Example 2 | 0.5 | −1 | −2 | −4 | −5 |
| Example 3 | 0 | 0.7 | 0.4 | 0.3 | −2 |
| Example 4 | 0 | 2 | 0 | −1 | −2 |
| Example 5 | 0 | −2 | −3 | −5 | −7 |
| Example 6 | 0 | −3 | −6 | −7 | −8 |
| Comparative Example 1 | 3 | −2 | −6 | −11 | −15 |
| Comparative Example 2 | 1.5 | −2 | −5 | −7 | −10 |

TABLE 4

Properties of conductive film

| | Viscosity (PaS) | Surface resistivity (mΩ/□) | Film thickness ($\mu$m) |
|---|---|---|---|
| Example 1 | 13 | 30 | 12 |
| Example 2 | 15 | 50 | 32 |
| Example 3 | 30 | 10 | 20 |
| Example 4 | 30 | 5 | 24 |
| Example 5 | 30 | 60 | 32 |
| Example 6 | 30 | 70 | 35 |
| Comparative Example 1 | 13 | 140 | 27 |
| Comparative Example 2 | 13 | 200 | 35 |

A comparison of Examples with Comparative Examples reveals that the composite particles of Examples 1 to 6 which are coated with reducible oxide undergo minimized shrinkage and form films having a low electric resistance. In Comparative Example 1, the electric resistance of film is low, but substantial shrinkage occurs upon firing. This is presumably because of the absence of an oxide coating and the small size of crystallites. The particles of Comparative Example 2 which are coated with yttrium oxide undergo minimized shrinkage, but form films having a very high electric resistance.

Japanese Patent Application No. 2001-023749 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A composite fine particle comprising a core of the general formula (1):

$$Ni_{(1-a-b)}Z_aZ'_b \quad (1)$$

wherein Z is at least one element selected from the group consisting of Ag, Au, Co, Cu, and Pd, Z' is at least one element selected from the group consisting of Li, K, Na, B, and P, "a" representative of a weight proportion of Z is 0 to 0.4, and "b" representative of a weight proportion of Z' is 0 to 0.1 with the proviso that "a" and "b" are not both zero at the same time, at least a part of the core surface being coated with an oxide of at least one element selected from the group consisting of Ag, Ba, Co, Cu, Ni, Sn, Ti, Zr, rare earth elements including Y, and Pd.

2. The particle of claim 1 wherein said element of the oxide is selected from the group consisting of Ag, Ba, Co, Cu, Ni, Sn, and Pd.

3. The particle of claim 1 wherein the total weight proportion of the oxide is up to 10% by weight based on the entire particle.

4. The particle of claim 1 wherein the core is comprised of crystallites with a size of 200 to 700 angstroms when analyzed by X-ray diffraction.

5. The particle of claim 1 having a volume resistivity of up to 100 mΩcm.

6. The particle of claim 1 having a mean particle size of 0.05 to 0.7 μm.

7. An electrically conductive paste comprising composite fine particles as set forth in claim 1 and an organic vehicle.

8. An electrically conductive film obtained by firing the conductive paste of claim 7 and having a surface resistivity of up to 100 mΩ.

* * * * *